A. J. COLLAR.
VALVE.
APPLICATION FILED DEC. 11, 1911.
1,059,037.
Patented Apr. 15, 1913.
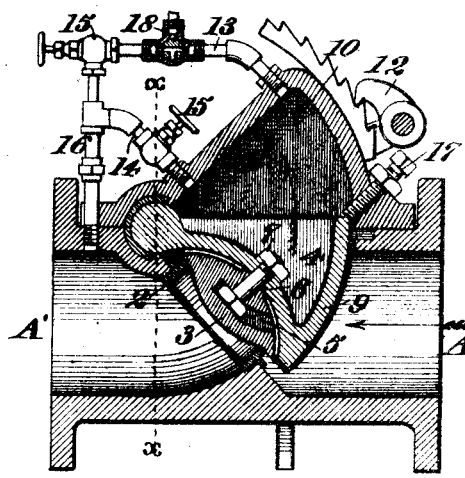
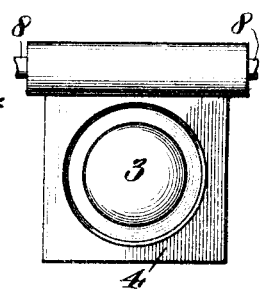
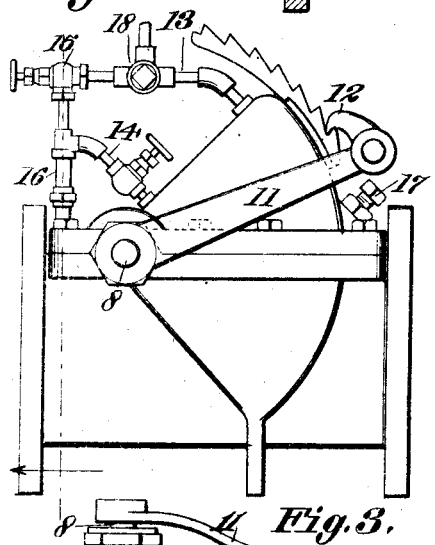
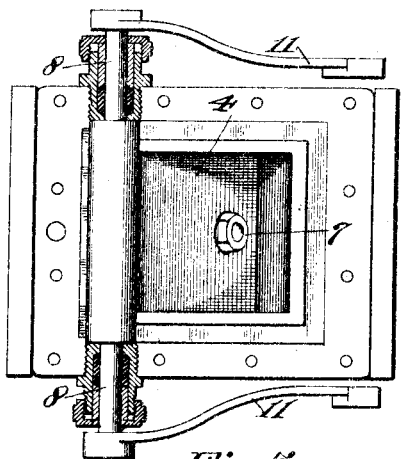
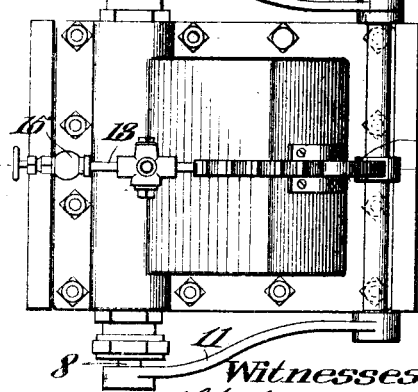
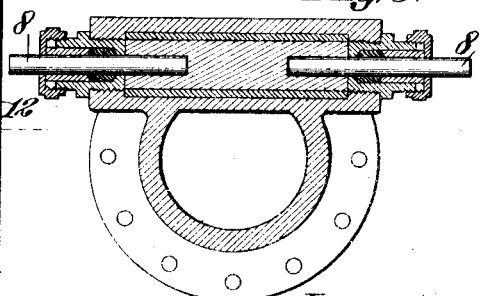
Witnesses
Charles Pickles
R. S. Berry
Inventor:
Adoniram J. Collar
By G. H. Strong, Atty

UNITED STATES PATENT OFFICE.

ADONIRAM J. COLLAR, OF YREKA, CALIFORNIA.

VALVE.

1,059,037.　　　　Specification of Letters Patent.　　Patented Apr. 15, 1913.

Application filed December 11, 1911.　Serial No. 665,075.

*To all whom it may concern:*

Be it known that I, ADONIRAM J. COLLAR, a citizen of the United States, residing at Yreka, in the county of Siskiyou and State of California, have invented new and useful Improvements in Valves, of which the following is a specification.

My invention relates to valves of that class which is designed to control the flow of liquids in pipes and for similar purposes.

It comprises a segmental carrier adapted to oscillate in a sector-shaped casing, which is provided with a seat in the line of the conduit, and a valve upon the carrier is adapted to close upon the seat when the carrier is moved down about its axis so as to close the conduit. Means are provided to close the valve upon its seat by the pressure of the flowing current, and means are provided to relieve said pressure from one side to apply to the other in such a manner as to raise the carrier and open the valve.

My invention also comprises details of construction which will be more fully explained by reference to the accompanying drawings in which—

Figure 1 is a longitudinal section of a portion of the conduit and my valve carrier and attachments. Fig. 2 is an exterior view showing a means for indicating and retaining valve in position. Fig. 3 is a top closed view. Fig. 4 is a top open view. Fig. 5 is a view taken through X—X of Fig. 1. Fig. 6 is a bottom view of the carrier and the valve.

In this description, as shown in the drawings, A is the inlet portion and A' the outlet portion of the conduit. This conduit has a seat 2, here shown as standing diagonally between the inlet and outlet portions of the conduit. The conduit is also formed with vertical side walls forming a sector-shaped chamber opening to the conduit.

3 is a valve closable upon the seat and mounted in a carrier 4, said carrier having vertical side walls paralleling the side walls of the sector-shaped chamber and spaced a short distance therefrom to permit a limited leakage therebetween. The valve is shown as double convex in its central portion, having an annular rim adapted to close upon the seat 2. The carrier has its lower face concavo-convex so that the upper convex face of the valve lies within the concavity of the carrier. The valve has a channel formed in it, as shown at 5, and the head of a bolt 6 slips into this channel so as to lie substantially central in the body of the valve. The outer end of the bolt 6 extends through the arched shell forming the bottom of the carrier and is retained in place by a nut, as at 7. The valve is free to turn upon its mounting so that it will seat itself properly when closed. The carrier 4 is provided with gudgeons 8 extending transversely through the apex of the angle opposite to the sector-shaped portion 9. This carrier is adapted to turn about the gudgeons 8 into a chamber 10 when the valve is opened, and to swing out of said chamber and down into the conduit A when the valve is closed. The position of the valve is conveniently shown by means of an arm or arms 11 fixed to the projecting ends of the shaft 8, said arms swing up and down in unison with the movement of the carrier. These moving parts may be retained in any desired position by means of a rack and pawl 12 or by equivalent frictional or other clamp by which such retention may be effected.

The operation of the valve will be as follows: The valve being closed, as shown in Fig. 1, the amount of leakage which may take place about the ends of the carrier 4 will allow water under pressure to enter from the conduit A above the carrier 4, and this amount of pressure will force the carrier down and will thus seat the valve and stop the flow of water. The valve 3 has a sufficient amount of space between itself and the arched shell of the carrier to allow a certain amount of water which leaks in from around the carrier to fill the cavity; the pressures within this space between the valve and its carrier counterbalancing each other. When it is desired to open the valve, it is effected as follows: Pipes 13 and 14 are connected with the upper part of the casing and are provided with valves or cocks 15, and these pipes are connected by another pipe 16 with the discharge portion A' of the conduit. There are two of these pipes in order that the amount of opening may be properly controlled and not be made too sudden by the opening of a single large pipe. Thereafter, when one of the valves 15 is opened, the water within the upper part of the chamber 10 will escape into the conduit below and thus relieve the pressure upon this face of the carrier. The lower face of the carrier in which the concave portion is made is of considerably larger area than that of the valve 3, as plainly shown in Fig. 6, hence the upward pressure exerted on the carrier will be as much greater than the downward pressure upon the valve as will be produced by the difference in area of these two parts. The result will be that this pressure will lift the valve from its seat, and the carrier swinging about its axis or shaft will move upward into the casing 10, thus allowing a flow of water through the conduit. The exact amount of opening of the valve will be shown, as previously described, by the indicating arms 11, and the valve may be retained in its open position by the retaining device 12, as previously described. If it is desired to maintain the valve in its closed position, this may be done by means of the screw bolt 17; this bolt being screwed down upon the upper angle of the carrier when such closure is necessary.

A valve of this character is adapted to be used equally well where the water flows from the direction opposite that previously described, that is from the conduit A' to the conduit A against the underside of the valve 3. When this is the case, the pressure of the water upon the lower side of the valve 3 and the carrier 4 will raise the valve from its seat when the cock 18 is open to exhaust the chamber 10 and thereby open the valve to any desired extent. The valve in this instance is closed by opening the valve 15 to admit water into the chamber 10 from the conduit A'. The area of the upper side carrier 4 being greater than that of the valve 3, the latter will be closed by the pressure of the water in the chamber 10.

It will be understood that suitable packing may be employed across the face and ends of the carrier to reduce the amount of leakage to just sufficient to insure the opening of the valve under the conditions above described.

Having thus described my invention, what I claim and desire to secure by Letters Patent is—

1. The combination with a conduit and seat located therein, of a valve closable upon the seat, a sector-shaped carrier to which the valve is loosely connected, a casing within which the carrier may swing about its apex to open and close the valve, a leakage inlet allowing liquid to enter the casing and press upon the upper surface of the carrier to close the valve, and means for relieving the pressure in said casing, to allow the liquid under pressure in the lower part of the casing to raise the valve from its seat.

2. A conduit having a seat, a valve closable upon the seat, a sector-shaped carrier having a concavity in the lower portion within which the valve is loosely suspended, said carrier having a pivot shaft at its apex about which it is turnable, a sector-shaped casing within which the carrier is movable, means for admitting liquid from the inlet portion of the conduit to fill the casing and press upon the carrier so as to close the valve, means for relieving the pressure in the casing to allow pressure to act on the lower surface of the carrier whereby the carrier is lifted and the valve opened by the difference in pressure upon the carrier over that of the valve, and means to indicate the amount of opening of the valve.

3. A conduit, having an inclined valve seat, a sector-shaped chamber extending to one side of the conduit, a carrier having gudgeons in the apex of the chamber and adapted to swing within the chamber and conduit, said carrier having a concave lower side, a double convex valve loosely supported in the concavity of the carrier and movable therewith to close upon the valve seat, and a valve-controlled passage communicating with the interior of the chamber above the carrier.

4. A conduit having an inclined valve seat, a sector-shaped chamber extending to one side of the conduit, a carrier having gudgeons in the apex of the chamber and adapted to swing within the chamber and conduit, said carrier having a concaved lower side, a double convex valve loosely supported in the concavity of the carrier and movable therewith to close upon the valve seat, a leakage passage from the inlet to the interior of the chamber to admit pressure fluid to the rear of the carrier to assist in closing the valve, and valve-controlled means for exhausting the said pressure fluid from the chamber to permit the valve to be opened.

5. A conduit, having an inclined valve seat, a sector-shaped chamber extending to one side of the conduit, a carrier having gudgeons in the apex of the chamber and adapted to swing within the chamber and conduit, said carrier having a concave lower side, a double convex valve having a radial channel, a bolt having its head disposed in the radial channel, said bolt extending through the carrier by which the valve is loosely supported with a space between itself and the contiguous surface of the carrier, means for introducing fluid under pressure from the conduit to the interior of the chamber above the carrier to close the valve, and separate means for exhausting the fluid to open the valve.

6. A conduit, having an inclined valve seat, a sector-shaped chamber extending to one side of the conduit, a carrier having gudgeons in the apex of the chamber and adapted to swing within the chamber and conduit, said carrier having a concave lower side, a double convex valve having a radial channel, a bolt having its head disposed in the radial channel, said bolt extending through the carrier by which the valve is loosely supported with a space between itself and the contiguous surface of the carrier, said carrier having an area greater than that of the valve, means for introducing fluid under pressure from the conduit to the interior of the chamber above the carrier to close the valve, and separate means for exhausting the fluid to open the valve.

7. A conduit, having an inclined valve seat, a sector-shaped chamber extending to one side of the conduit, a carrier having gudgeons in the apex of the chamber and adapted to swing within the chamber and conduit, said carrier having a concave lower side, a double convex valve loosely supported in the concavity of the carrier and movable therewith to close upon the valve seat, and pressure relief pipes having controlling cocks, and connecting with the chamber and with the conduit.

8. A conduit having an inclined valve seat, a sector-shaped chamber extending to one side of the conduit, a carrier having gudgeons in the apex of the chamber and adapted to swing within the chamber and conduit, said carrier having a concave lower side, a double convex valve loosely supported in the concavity of the carrier and movable therewith to close upon the valve seat, pressure relief pipes having controlling cocks and connecting with the chamber and with the conduit, and means exterior of the conduit for locking the carrier against movement in various positions.

In testimony whereof I have hereunto set my hand in the presence of two subscribing witnesses.

ADONIRAM J. COLLAR.

Witnesses:
JOHN H. HERRING,
CHARLES EDELMAN.